March 12, 1957 E. WERTZ 2,784,545
SLAT CONTROL MECHANISM FOR COTTON HARVESTERS
Filed April 27, 1955 4 Sheets-Sheet 1

Inventor
Ellis Wertz
By Donald C. McGaughey
Attorney

United States Patent Office 2,784,545
Patented Mar. 12, 1957

2,784,545
SLAT CONTROL MECHANISM FOR COTTON HARVESTERS

Ellis Wertz, Madison, Wis., assignor to Allis-Chalmers Manufacturing Company, Milwaukee, Wis.

Application April 27, 1955, Serial No. 504,162

8 Claims. (Cl. 56—41)

This invention relates to cotton harvesters, and it is concerned more particularly with an improvement in cotton picking machines of the type disclosed in U. S. Patent 2,671,298, granted March 9, 1954, to R. C. Fergason for Cotton Picker.

In cotton picking machines of the mentioned type an upper and a lower chain are driven in an oval path about a set of drive sprockets at one end and about a set of idlers at the other end of such path. Rotary cotton contacting elements or picking spindles are rotatably mounted in elongated slat structures and provision is made for rotating these spindles when they are in picking relation to the cotton. The slats are pivotally mounted at their upper and lower ends on the upper and lower chains and are carried thereby about the oval path. The direction in which the chains and slats are driven is such that the spindles move through a picking tunnel in a rearward direction, and upon emerging from the tunnel pass about the rear end of the oval path and then outside the tunnel in a forward direction. As the slats which carry the cotton loaded spindles pass about the rear arcuate portion of the oval path they move into cooperative engagement with a control mechanism which pivots the slats and spindles into a reclined, that is a rearwardly inclined, position and suitable provisions are made to maintain the spindles in said reclined position while they move forward toward and through a stationary, comb like stripping assembly which removes the cotton from the spindles.

In spindle type cotton picking machines of the above outlined character the spindle slats become subject to centrifugal force as they pass about the rearward arcuate end of the oval path from the picking to the stripping side thereof, and as a result, the slats tend to whip about their pivotal mountings. Slat reclining mechanisms as heretofore suggested have generally been so constructed and arranged as to become effective at a point slightly before the end of the rearward arcuate portion of the oval path and before the pivot centers of the spindle slats enter the forward run of the stripping side of said path. With the slat reclining mechanism so arranged, whipping of the slats as they swing around the rear end of the oval path brings them into abrupt contact with a slat reclining element of the mechanism, which results in impact loading upon the slat and particularly upon the pivotal mountings thereof.

In addition to the mentioned impact loading which may result from abrupt pivotal movement of the slats into reclined positions, such abrupt pivotal slat movement and the simultaneous whipping movement of the next succeeding slat may bring the picking ends of the spindles on the reclined slat into contact with those of the following slat. Such contact, termed "ringing," is very objectionable because of the resulting wear, particularly at the extreme outer ends of the spindles which seriously decreases the picking efficiency of the spindles.

Another problem encountered in slat control mechanisms as heretofore suggested is the critical nature of the operative adjustment of the mechanism. Should the mechanism be adjusted too close, severe impact loading results and if adjusted too far the spindles are not positioned properly for stripping.

Accordingly, the principal object of the present invention is to provide an improved cotton picking machine which avoids the disadvantages and shortcomings of the prior art outlined above.

Another object of this invention is to provide an improved slat control mechanism for a cotton picker of the hereinabove outlined character, wherein a slat reclining element is so constructed and arranged as to avoid impact loading on the slats and on the pivotal mountings thereof.

A further object of this invention is to provide a slat control mechanism of the hereinabove outlined character which is simple to adjust and which requires a minimum amount of corrective readjustment due to wear.

These and other objects and advantages are attained by the present invention, various novel features of which will be apparent from the description herein and the accompanying drawings disclosing an embodiment of the invention, and will be more particularly pointed out in the appended claims.

Referring to the drawings.

Figure 1:
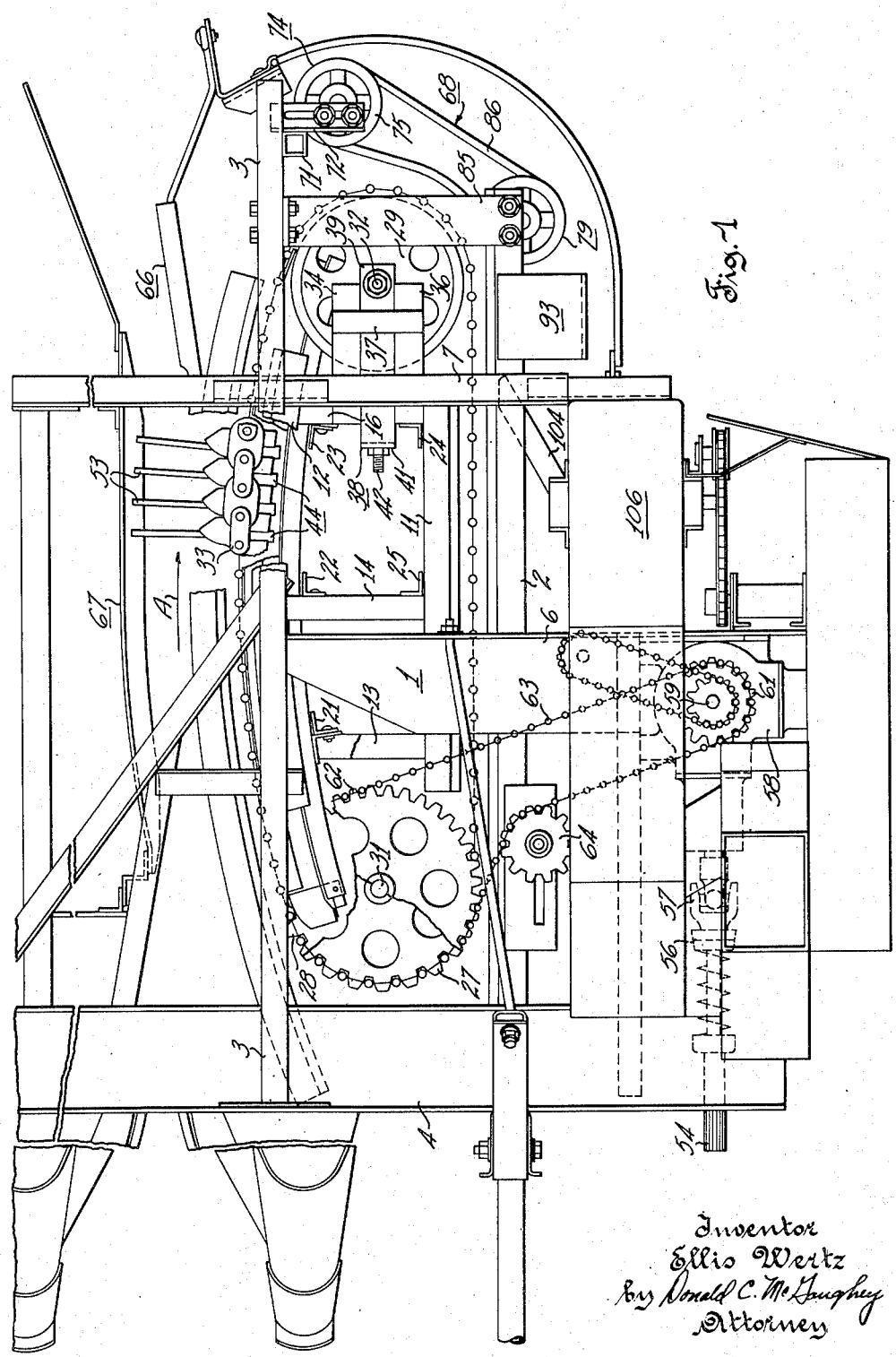
Fig. 1 is a plan view of a cotton harvester picking unit embodying the invention with parts broken away for purposes of disclosure.

The cotton picking unit 1 shown in Fig. 1 comprises a frame structure of generally conventional construction including a pair of longitudinally extending frame or rail members 2 and 3 which are rigidly secured in spaced relation to one another by transverse frame members 4, 6 and 7. The frame structure further includes upper chain guide rails 11 and 12 which are rigidly secured to transverse frame members 6 and 7 and which define a portion of a generally oval or oblong path of chain and slat travel which will be more fully described hereinbelow. The chain guides are additionally reinforced by transverse braces 13, 14 and 16. Angle supports 21 through 25 depend from braces 13, 14 and 16 and support lower chain guide rails (not shown) which correspond in construction to upper rails 11 and 12.

The frame structure rotatably supports a drive shaft 31 which fixedly mounts a pair of vertically spaced upper and lower drive sprockets or forward rotary guide structures 27 and 28, respectively, to define the forward end of the oval path, that is, to the left as viewed in Fig. 1. A vertically spaced pair of upper and lower idler wheels or rearward rotary guide structures 29 (Fig. 1) and 30 (Fig. 2) are rotatably mounted by means of shaft 32 to define the rearward end of the oval path of slat travel, that is at the right as shown in Fig. 1. An upper slat chain 33, of conventional roller link construction, is operatively trained about the upper drive sprocket 27 and idler wheel 29 for travel about the oval path. A lower slat chain (not shown) identical in construction to upper chain 33 is operatively trained about the lower drive sprocket 28 and idler wheel 30.

The upper chain idler wheel 29 is mounted for back and forth adjustment in chain tightening and chain slackening directions by means of a slide bracket 38. As best shown in Fig. 1 a pair of spaced guide bars 34 and 36 are rigidly secured as by welding to transverse brace 16 and a pair of transverse slide straps 37 (only the upper is shown) are rigidly attached, as by welding, to opposite top and bottom sides of bars 34 and 36, thereby connecting the outer ends thereof together and providing a mounting bracket for the upper slide bracket 38. Slide bracket 38 comprises a long leg 39 slidably passing through the aperture defined by bars 34 and 36, and straps 37, and a short leg 41 depending at a right angle from leg 39 and having an aperture therethrough. Transverse brace 16 rigidly supports a horizontally extending carriage bolt 42 which slidably passes through the aperture in short leg 41 of the slide bracket 38. A nut is threaded on bolt 42 and when tightened is placed in load transmitting engagement with leg 41 of bracket 38 to move the latter in chain tightening direction toward the rear of the picking unit, that is, to the right as viewed in Fig. 1. The long leg 39 is provided with a vertical aperture which receives shaft 32, on which idler wheel 29 is mounted. It will be understood that the drive sprocket and idler wheel mountings are provided with suitable antifriction bearing assemblies (not shown) of conventional construction.

The lower idler wheel 30 is mounted by means of a lower slide bracket (not shown) similar in construction to that of upper bracket 38.

Figure 2:
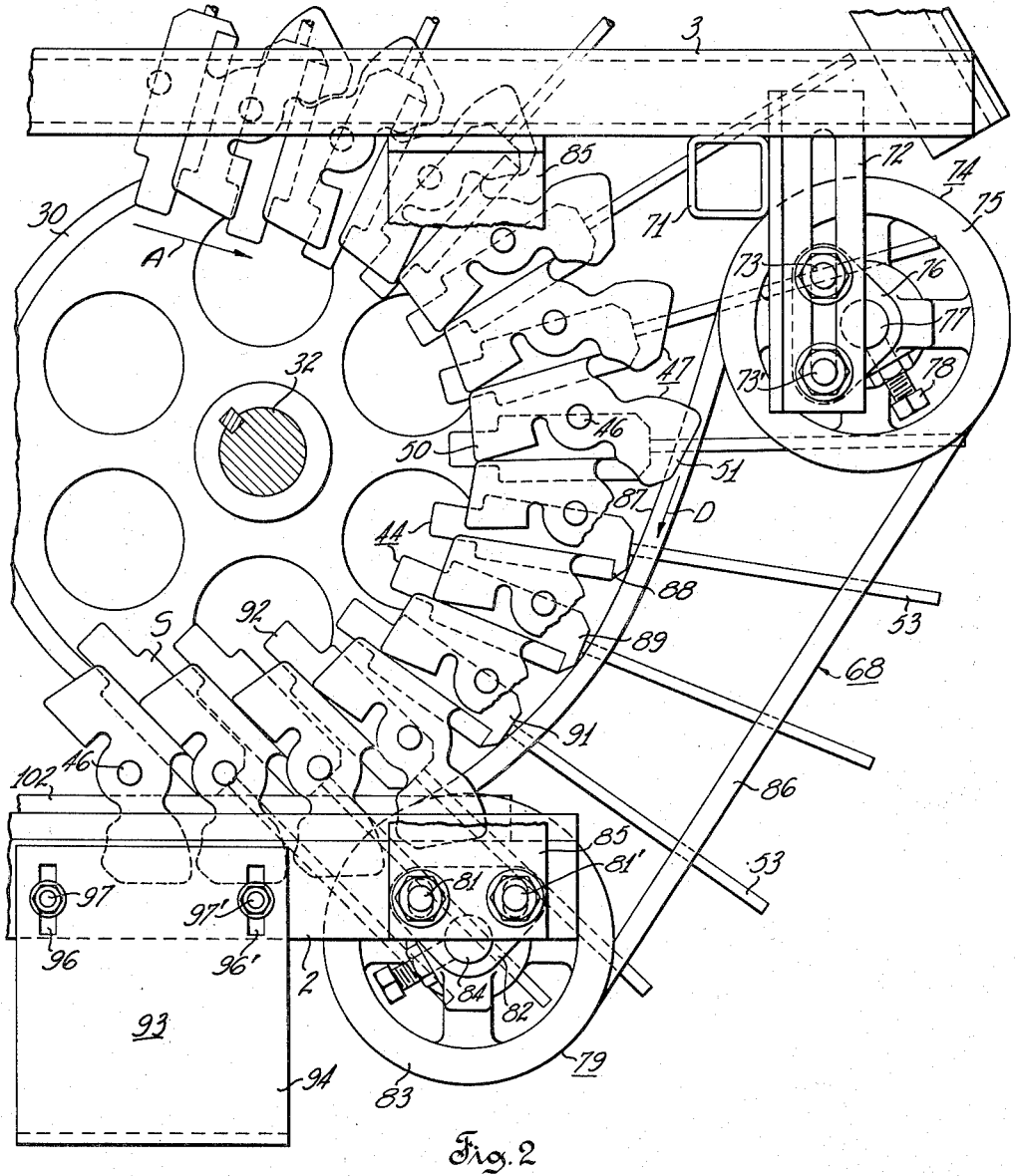
Fig. 2 is an enlarged partial plan view of one end of the picking unit shown in Fig. 1 with some parts removed for purposes of disclosure and other parts shown in section.

Vertically extending slat structures 44 (Figs. 1 and 3) are pivotally connected at their upper and lower ends to extensions 45 of the pivot pins 46 of the roller chain 33 by means of suitable hinge brackets 47 (Fig. 2). Each hinge bracket 47 includes a vertical slat mounting or attaching flange 48 which is secured to the slat 44 by means of cap screw 49. The bracket 47 further includes stop flanges 50 and 51 which extend horizontally or generally at right angles to attaching flange 48. Stop flange 51 provides a mounting aperture adapted to receive the extension 45 of chain pivot pin 46. The hinge bracket 47 is secured on pin 46 by conventional means including a cotter pin 52. Each vertical slat structure 44 includes a plurality of vertically spaced horizontally extending cotton picking spindles 53 which are rotatably mounted therein. Due to the pivotal mounting of the slat, it may swing from a picking position (Fig. 1) in which its associated spindles extend at right angles to the direction of chain travel, to rearwardly inclined positions such as illustrated by the slat structure S in Fig. 2.

The herein disclosed cotton picking unit 1 is adapted for mounting on a conventional farm tractor and it is powered by a coupling shaft 54 (Fig. 1) connected with a power take-off shaft (not shown) of the tractor. A slip clutch 56 and a universal joint 57 serve to connect shaft 54 with main drive gear box 58. Main drive gear shaft 59 is operatively associated in gear box 58 and nonrotatably supports drive sprocket 61. A driven sprocket 62 is nonrotatably secured to drive shaft 31 and a drive chain 63 is operatively trained about sprockets 61 and 62 to provide power for driving upper and lower chain sprockets 27 and 28 and thereby the upper and lower slat chains. An idler sprocket 64 is conventionally arranged for tensioning the drive chain 63.

As the upper and lower slat chains are driven about the oblong path in the direction of arrow A, Fig. 1, the pivotally mounted spindle slats 44 are carried through a picking tunnel along one side of the oval path defined by stalk guide and stalk crowder structures 66 and 67 (Fig. 1), respectively. During passage through the picking tunnel the spindles are at right angles to the carrying chains and are in contact with the cotton bolls. The spindles are caused to rotate during passage through the picking tunnel by means of a conventional spindle drive mechanism (not shown). Rotation causes the cotton to wind upon the spindles and be removed from the cotton plant. As the loaded spindles emerge from the picking tunnel they pass about the upper and lower rear idler wheels 29 and 30 where they encounter a slat control mechanism 68, best shown in Figs. 2 and 3.

The control mechanism 68 is mounted on rearward portions of frame members 2 and 3 as follows. A suspension member 71, tubular in form, is positioned in depending relation to a rearward portion of frame member 3 and rigidly secured thereto as by welding. A horizontally extending mounting bracket 72 is fixedly attached to member 71 and extends transversely of frame member 3 toward the frame member 2. Bracket 72 is provided with an elongated longitudinally extending mounting aperture therethrough which is adapted to slidably receive a pair of carriage bolts 73 and 73'. A sheave assembly 74 including sheave 75 and mounting support 76 is secured to bracket 72 by means of carriage bolts 73 and 73' which are passed through the elongated aperture and threaded into suitable drilled and tapped holes contained in support 76. The sheave 74 is rotatably mounted on support 76 by conventional means including a suitable bearing structure (not shown) and a vertically extending pin 77 fixedly secured in support 76 by set screw 78. When desired the sheave, bearing and pin assembly may be removed from support 76 by releasing set screw 78.

A similar sheave assembly 79, identical in construction to sheave assembly 74 is adjustably mounted on a rearward portion of frame member 2 by means of a pair of carriage bolts 81, 81' which are passed through suitable elongated apertures in frame member 2 and threaded into suitable drilled and tapped holes in the mounting support 82. The sheave 83 is rotatably supported on the support 82 in a manner identical to that of sheave 75, with the pin 84 of the sheave 83 being parallel to the pin 77 which mounts sheave 75. The frame members 2 and 3 are reinforced by a transverse brace 85 (Figs. 2 and 3) which is secured therebetween as by bolting.

In the installed condition (Fig. 3) the sheaves 75 and 83 are in spaced horizontal alignment with each other, with sheave 75 being positioned rearward of and adjacent the picking side of the unit, and sheave 83 offset from sheave 75 in the direction of slat travel. An elongated flexible slat reclining element in the form of an endless V-belt 86 is trained about the spaced sheaves 75 and 83. The belt 86 is of the ordinary rubber fabric composition type as commonly used for power transmitting purposes. The flexibility of belt 86 enables it to assume the contoured configuration illustrated in Fig. 2 in which the outer surface portion 87 thereof is in cooperative engagement with a plurality of slats 88, 89 and 91, individually numbered for purposes of analysis. It will be noted that the belt 86 is so mounted as to contact the slats 88, 89 and 91 between the uppermost row of spindles 53 and the uppermost end of the slats.

In operation, the slats in passing about the rear idler wheels 29 and 30 become subject to centrifugal force, and due to their pivotal mounting on the chains by pivot pins 46, the slats tend to pivotally swing forward, that is in a clockwise direction as viewed in Fig. 2, about the axes of the respective pivot pins 46. At a point approximately half way around the rear arcute portion, the slats encounter the V-belt 86 of the slat control mechanism 68. Slat 88, for example, is shown in a position assumed just after initial contact with belt 86. The belt 86 is now in frictional engagement with the slat 88 and thereby prevents any clockwise pivotal movement thereof. This frictional contact serves to control the angular relation of the slat 88 to the carrying chain 33. As the slat 88 passes successively to the positions indicated in Fig. 2 by slats 89 and 91, it is gradually pivoted into a rearwardly inclined position until it reaches the point at which it loses contact with the belt 86, at which time it is in the angular position illustrated by slat 92 of Fig. 2.

It is readily apparent that the V-belt 86, having resilient characteristics and mounted for movement in the direction of slat travel by means of the rotatable sheaves 75 and 83, affords a very gentle yielding contact with the slats. This of course reduces the wear and impact loading upon the slat mounting pins 46 and reduces considerably the amount of cotton which previously was dislodged from the spindles when the slats 44 encountered a control or positioning mechanism of conventional construction. In the past it has been customary to rely on stop flanges 50 and 51 (Fig. 2), which are part of the hinge brackets 47, to control the tendency of the slats to pivot to centrifugally adjusted positions. These flanges were, of course, subject to wear at points of contact and the utilization of the flexible V-belt type control mechanism has minimized to a great extent the amount of wear on these parts.

As the rearwardly inclined slats leave the rear arcuate portion of the oval path and travel forwardly they encounter a spindle position retaining guide 93 which maintains the spindles in their reclined positions. The retaining guide 93 comprises an elongated U-shaped member which is located just forwardly of the sheave mounting support 79 in a horizontal position so as to straddle the uppermost row of picking spindles 53. The retainer 93 presents an upper leg 94 which contains a pair of transverse slots 96 and 96' (Fig. 2) which are placed in registry with suitable apertures in the frame member 2. A pair of bolts 97 and 97' are passed therethrough and secured by suitable lock nuts. The lower leg 99 of the retainer 93 rigidly supports a rail supporting flange 101 in a suitable manner. A guide rail 102 is secured in operative position on flange 101 by suitable screws 103 which pass through the flange and into the rail.

Figure 3:
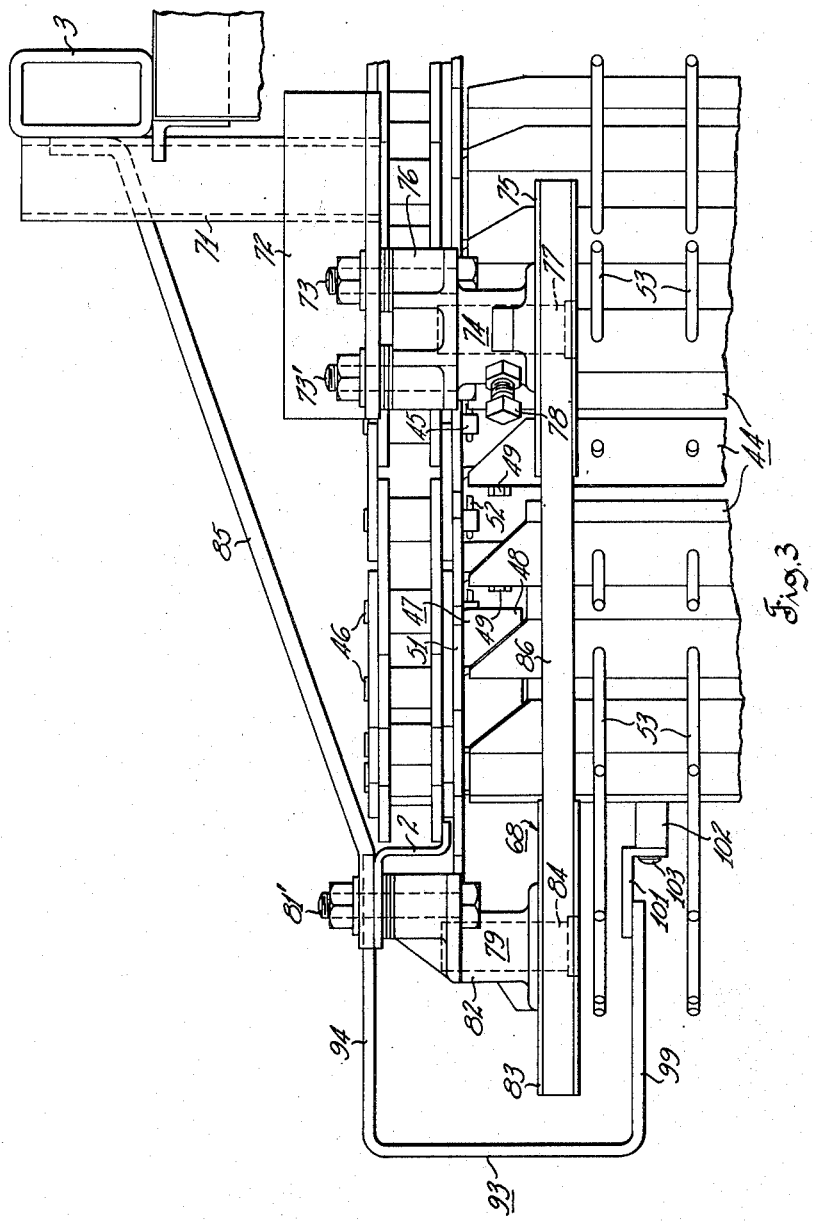
Fig. 3 is an enlarged partial elevational view of the end of picking unit shown in Fig. 2.

In the installed condition of the retaining guide 93, as shown in Figs. 2 and 3, its upper and lower legs 94 and 99 straddle the top row of rearwardly inclined spindles, and the rail is so positioned as to bear horizontally against the reclined slat structures 44 at portions thereof between the uppermost row and the next underlying row of picking spindles. The rail may be positioned closer or farther away from the passing spindle slats 44 upon loosening bolts 97 and 97'. After the guide 93 has been moved to any selected position of horizontal adjustment transversely of frame member 2, the bolts may be tightened to secure the guide 93 including the rail 102 in adjusted position.

In operation, the spindle slats 44, while traveling in the direction of arrow A in Figs. 1 and 2, move in endless succession against the V-belt 86 which is thereby driven in the direction of arrow D in Fig. 2. As a result of its contact with the belt 86 each slat is placed into the reclined position in which it leaves the rearward end of the arcuate path. Continued forward movement of the reclined slats 44 brings them into contact with the rail 102 so that the rearward inclination of the slats which has been achieved by the control mechanism 68 will be maintained during forward movement of the slats.

A stationary comb like stripping device of conventional construction, generally designated by the reference character 104 (Fig. 1), is mounted on the picker frame in forwardly spaced relation to the retaining guide 93. The picking spindles 53 loaded with cotton pass through the stripper which removes the picked cotton. A conventional conveying mechanism, operatively mounted in housing 106 transports the cotton to a suitable point of storage.

Upon leaving the stripping mechanism the slats 44 and spindles 53 travel about the front drive sprockets 27 and 28 and again enter the picking tunnel. Under normal operating conditions wear of the upper and lower chains causes a slackening in the tension thereof. Retensioning of the chains is accomplished by moving slide bracket 38 and idler wheel 29 in a chain tightening direction, that is to the right in Figs. 1 and 4, by the tightening of the nut on carriage bolt 42. When the chains are new the rear idler wheel 29 is in the position illustrated by the solid line in Fig. 4. In this position of adjustment the outer edges of the slats 44 in passing about the rear idler wheel 29 follow a path of travel indicated by solid line B. As the idler wheel 29 is moved in a chain tightening direction it will ultimately assume the adjusted position indicated by the dot-dash line 29' in Fig. 4. In this extended position of adjustment the outer edges of slats 44 will follow a path of travel indicated by the dot-dash line C. It will be understood that the adjustment of idler wheel 29 is a step by step process and that the adjusted position as indicated by dot-dash line 29' indicates a wear condition in which the slat carrying chains are worn out and require replacement. It will be readily apparent then that the inherent resiliency and flexibility of the V-belt 86 will accommodate several chain tightening adjustments before adjustment of the control mechanism 68 in a belt loosening direction is required.

Figure 4:
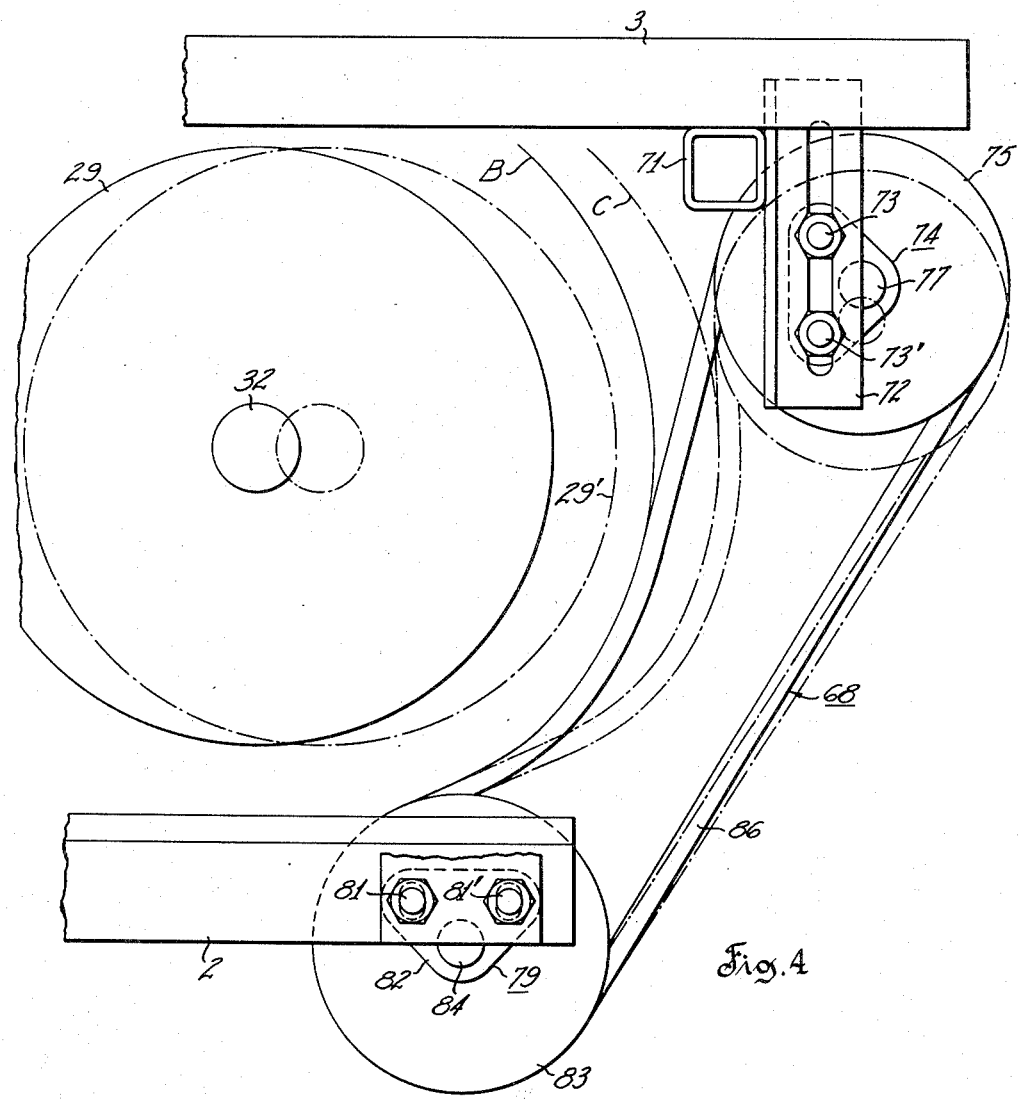
Fig. 4 is an enlarged partial plan view of the end of the picking unit shown in Fig. 1 with parts removed and showing the mechanism in relative positions of adjustment.

Continued adjustment of idler wheel 29 will of course increase the deflective effect of the belt 86 upon the slats 44 due to increased tension of the belt. In order to relieve this condition, it is a simple matter to release carriage bolts 73, 73' and slide the sheave assembly 74 along the slot in bracket 72 in the direction of slat travel until the belt tension has been reduced to the desired extent. The assembly 74 is then secured in place by the tightening of bolts 73 and 73'. As shown in Fig. 4, the control mechanism 68 is adjustable to selective positions which will accommodate any adjusted position of the idler wheel 29.

The angle or degree of rearward inclination of the slats may be controlled by adjusting the sheave assembly 79 transversely into closer proximity to the passing slats 44 or to a position more remote therefrom. The bolts 81, 81' are simply loosened and the transverse slots in frame member 2 permit the desired adjustment. The bolts 81, 81' are then tightened to secure the sheave assembly 79 in place. The adjustment of retaining guide 93 should correspond to that of the sheave 83 in order that the slats 44 be maintained in the desired position of adjustment achieved by the control mechanism 68.

It should be understood that it is not intended to limit the invention to the particular forms and details described hereinabove, and that the invention includes such other forms and modifications as are embraced by the scope of the appended claims.

It is claimed and desired to secure by Letters Patent:

1. A cotton harvester comprising, in combination, an endless flexible slat carrier; a supporting structure mounting said carrier for travel in an endless path around a pair of horizontally spaced rotary guide structures; a series of individual spindle slats mounted on said carrier for horizontal back and forth pivotal movement about vertical axes; a vertically spaced series of horizontally extending picking spindles rotatably mounted on each of said slats; and control means cooperable with said slats comprising a flexible slat reclining element operatively mounted on said supporting structure for cooperation with said slats at a point adjacent one of said rotary guide structures, said slat reclining element having a contoured configuration presenting a surface portion in cooperative engagement with a plurality of said slats as they pass about said one of said rotary guide structures.

2. A cotton harvester comprising, in combination, an endless flexible slat carrier; a supporting structure mounting said carrier for travel in an endless path around a pair of horizontally spaced rotary guide structures; a series of individual spindle slats mounted on said carrier for horizontal back and forth pivotal movement about vertical axes; a vertically spaced series of horizontally extending picking spindles rotatably mounted on each of said slats; and control means cooperable with said slats comprising an elongated flexible slat reclining element operatively mounted on said supporting structure for cooperation with said slats at a point adjacent one of said rotary guide structures, said slat reclining element having a surface portion resiliently engaging a plurality of said slats independently of said spindles as they pass about said one of said rotary guide structures thereby causing a gradual pivoting of said slats into a uniformly reclined position.

3. A cotton harvester comprising, in combination, an endless flexible slat carrier; a supporting structure mounting said carrier for travel in an endless path around a pair of horizontally spaced rotary guide structures; a series of individual spindle slats mounted on said carrier for horizontal back and forth pivotal movement about vertical axes; a vertically spaced series of horizontally extending picking spindles rotatably mounted on each of said slats; and slat control means comprising transversely spaced horizontally aligned sheaves mounted on said supporting structure adjacent one of said rotary guide structures, and an endless flexible element trained about said sheaves in cooperative engagement with a plurality of said slats as they pass about said one of said rotary guide structures thereby causing a gradual pivoting of said slats and associated spindles into reclined positions.

4. A cotton harvester comprising, in combination, an endless flexible slat carrier; a supporting structure mounting said carrier for travel in one direction in an endless oval path about a pair of horizontally spaced forward and rearward rotary guide structures; a series of individual spindle slats mounted on said carrier for horizontal back and forth pivotal movement about vertical axes; a vertically spaced series of horizontally extending picking spindles rotatably mounted on each of said slats; a pair of sheaves mounted on said supporting structure adjacent said rearward rotary guide structure for rotation on spaced parallel vertical axes and in horizontal alignment with each other, one of said sheaves positioned adjacent one side of said rearward rotary guide structure, the other of said sheaves offset from said one sheave in said direction of travel of said slat carrier, and an endless belt trained about said sheaves and contoured by said slats to resiliently contact with a plurality of said slats traveling about said rearward guide structure thereby causing a gradual pivoting of said slats into uniformly reclined positions.

5. A cotton harvester comprising, in combination, an endless flexible slat carrier; a supporting structure mounting said carrier for travel in one direction about an endless oval path about a pair of horizontally spaced forward and rearward rotary guide structures; a series of individual spindle slats mounted on said carrier for horizontal back and forth pivotal movement about vertical axes; a vertically spaced series of horizontally extending picking spindles rotatably mounted on each of said slats; a pair of sheaves mounted on said supporting structure adjacent said rearward rotary guide structure for rotation on spaced parallel vertical axes and in horizontal alignment with each other, one of said sheaves positioned rearward of and adjacent one side of said rearward rotary guide structure, the other of said sheaves offset from said one sheave in said direction of travel of said carrier; an endless belt trained about said sheaves and contoured by said slats to resiliently contact with a plurality of said slats traveling about said rearward rotary guide structure thereby causing a gradual pivoting of said slats into uniformly reclined positions, and at least one of said sheaves affording selective adjustment thereof in belt tightening and belt slackening directions for controlling the degree of reclining movement imparted to said slats.

6. In a picking unit for cotton harvesters of the type wherein a pair of upper and lower endless conveyer chains are operatively mounted on a supporting frame for travel in an oval path, the combination of upper and lower chain supporting wheels adjustably mounted on said frame structure at one end of said oval path for back and forth longitudinal movement in chain slackening and chain tightening directions, a series of individual spindle slats mounted on said chains for horizontal back and forth pivotal movement about vertical axes; a vertically spaced series of horizontally extending picking spindles rotatably mounted on each of said slats; control means for said slats mounted on said supporting frame adjacent said one end of said oval track and having a flexible slat contacting element in cooperative engagement with a plurality of slats, said slat control means adjustably mounted whereby the latter may be selectively positioned to accommodate longitudinal movement of said upper and lower chain mounting wheels in chain tightening and chain slackening directions.

7. A cotton harvester unit comprising in combination, a support structure including a pair of transversely spaced longitudinal extending frame members extending rearward of said unit; an endless flexible slat carrier mounted on said support for travel in an endless oval path about a pair of horizontally spaced forward and rearward rotary guide structures; a series of individual spindle slats mounted on said carrier for horizontal back and forth pivotal movement about vertical axes; a vertically spaced series of horizontally extending picking spindles rotatably mounted on each of said slats; sheaves mounted on each of said frame members adjacent said rearward rotary guide structure for rotation on parallel vertical axes; and an endless flexible element trained about said sheaves and having a surface portion in resilient cooperative engagement with a plurality of said slats as they pass about said rearward rotary guide structure, said engagement causing a gradual pivoting of said slats into a reclined position.

8. A cotton harvester unit comprising in combination, a support structure including a pair of transversely spaced longitudinal extending frame members extending rearward of said unit; an endless flexible slat carrier mounted on said support for travel in an endless oval path about a pair of horizontally spaced forward and rearward rotary guide structures; a series of individual spindle slats mounted on said carrier for horizontal back and forth pivotal movement about vertical axes; a vertically spaced series of horizontally extending picking spindles rotatably mounted on each of said slats; sheaves mounted on each of said frame members adjacent said rearward rotary guide structure for rotation on parallel vertical axes; and an endless flexible belt trained about said sheaves and having a surface portion in resilient cooperative engagement with a plurality of said slats as they pass about said rearward rotary guide structure, said engagement causing a gradual pivoting of said slats into a reclined stripping position, and at least one of said sheaves affording selective adjustment thereof in belt tightening and belt slackening directions for controlling the degree of reclining movement imparted to said slats.

References Cited in the file of this patent
UNITED STATES PATENTS

| | | |
|---|---|---|
| 1,742,493 | Berry | Jan. 7, 1930 |
| 2,058,513 | Rust et al. | Oct. 27, 1936 |
| 2,671,298 | Fergason | Mar. 9, 1954 |
| 2,680,341 | Haring | June 8, 1954 |
| 2,703,474 | Smith | Mar. 8, 1955 |